United States Patent [19]
Vollmer

[11] 4,016,902
[45] Apr. 12, 1977

[54] END-CONTROL AGRICULTURAL SPRINKLER IRRIGATION SYSTEM

[76] Inventor: George Vollmer, Rte. No. 1, Americans Falls, Idaho 83211

[22] Filed: Nov. 11, 1975

[21] Appl. No.: 630,911

[52] U.S. Cl. .............................. 137/344; 239/212
[51] Int. Cl.$^2$ ........................................ B05B 15/10
[58] Field of Search .......... 239/212; 180/49, 24.08; 137/344

[56] References Cited
UNITED STATES PATENTS

| 3,800,820 | 4/1974 | Trunnell | 137/344 |
| 3,811,617 | 5/1974 | Cornelius | 239/212 X |

Primary Examiner—Alan Cohan
Attorney, Agent, or Firm—Mallinckrodt & Mallinckrodt

[57] ABSTRACT

An agricultural sprinkler, irrigation system, having wheel-mounted, sprinkler-carrying, pipe sections coupled together end-to-end with a centrally located mover unit to form a sidewise movable, elongate, water supply pipeline rotatable about its longitudinal axis is powered by drive means mounted on the mover unit and controllable from an end of the pipeline by mechanism which includes means for transmitting rectilinear movement of a rotating member as rectilinear movement of a non-rotating member and an assembly of switches controlled by such movement-transmitting means and, in turn, controlling operation of the drive means. The movement-transmitting means preferably comprises a flanged sleeve, encircling the pipeline adjacent to the drive means for axial rotation therewith and movable back and forth along the pipeline, as the rotating member, and a reciprocable, rectilinear bar arranged to actuate the switches and having an antifriction end confronting and abutting against the flange of the sleeve as the non-rotating member. Movement of the rotating sleeve toward the non-rotatable bar by increments that are predetermined by desired operation of the drive means is accomplished at an end of the pipeline by pulling a preferably flexible control line that extends to such end from connection with means for moving the sleeve toward the bar. Resilient means are provided for returning the bar and sleeve, and means are provided at the control end of the pipeline for holding the flexible control line in any given operating position.

20 Claims, 10 Drawing Figures

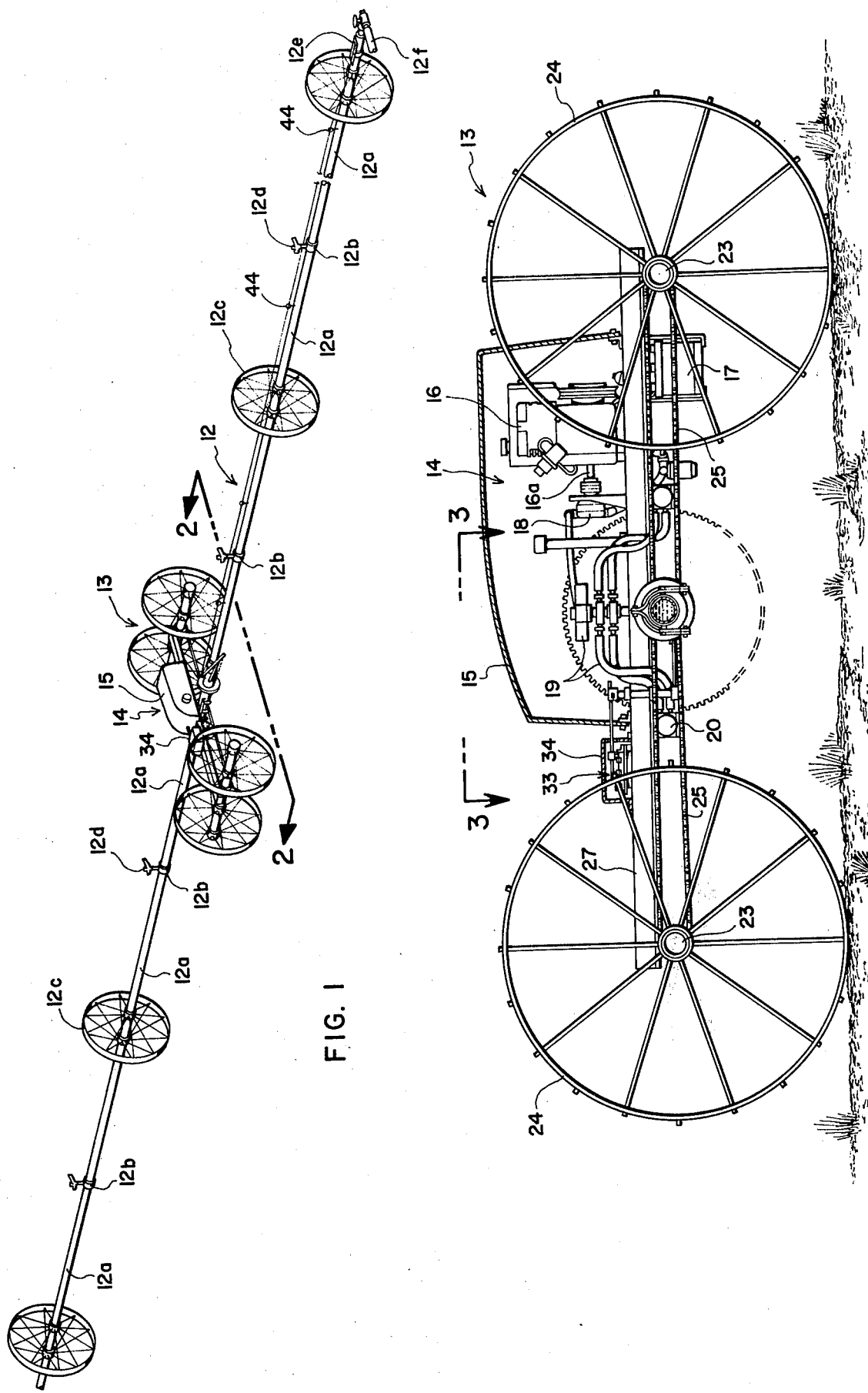

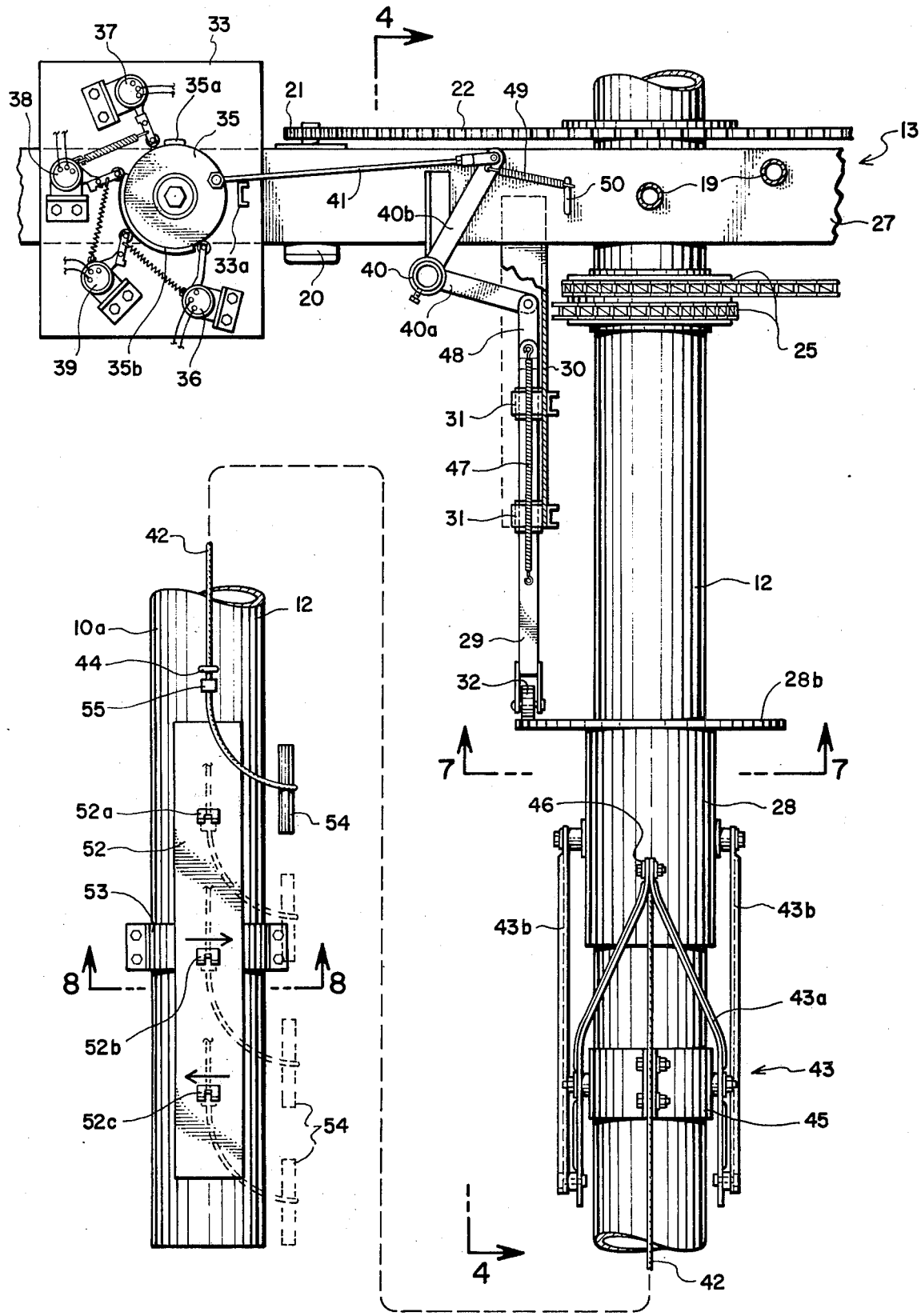

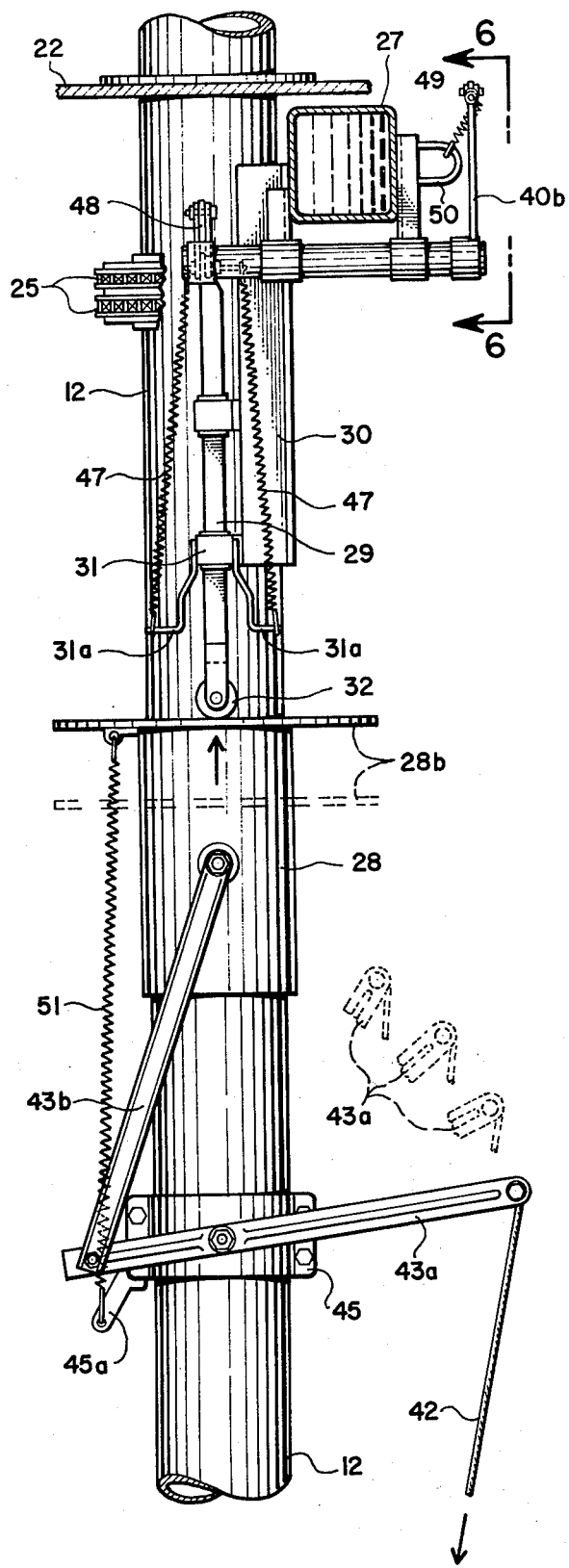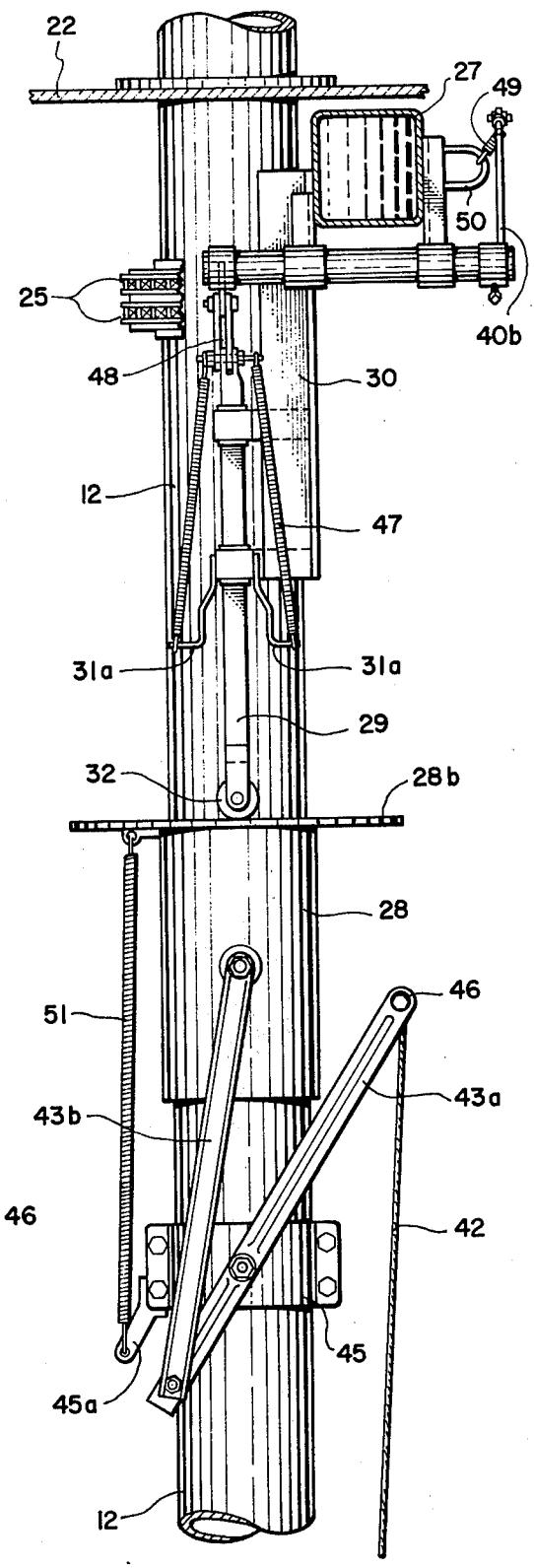

END-CONTROL AGRICULTURAL SPRINKLER IRRIGATION SYSTEM

BACKGROUND OF THE INVENTION

1. Field

The invention is in the field of agricultural sprinkler, irrigation systems of the type in which a mover unit, equipped with power drive, is located intermediate the length of a sprinkler-carrying pipeline made up of coupled, wheel-mounted sections that are rotated in unison by the power drive during movement of the system from place to place in an area to be irrigated.

2. State of the Art

Agricultural sprinkler systems of the type concerned are normally controlled at the power drive located centrally of a pipeline that often extends across several acres of cropland. This requires the user to periodically walk a considerable distance to start up the engine and move the rig to a new location for the progressive sprinkling of an area being irrigated by the system. It has been recognized heretofore that provision for power drive control from an end of the pipeline would be highly advantageous, and some attempts have been made to provide for such control electrically. But electrical control has significant drawbacks and is not applicable to various widely used systems.

For example, in a known system, electrical conducting wires are mounted along a pipeline from an end thereof to operate a mover unit including a power drive which rotates the pipeline. In such system, the conducting wires rotate with the irrigation line, while the mover unit, of course, does not. In order to transmit electrical power from such rotating conducting wires to appropriate electrical means mounted on the mover unit, a slip ring construction is utilized. However, such a slip ring structure has been found to be troublesome operationally due to corrosion and short circuiting that results from sprinkling of water from the irrigation line into the area of such slip ring structure.

It will therefore be understood that it is highly desirable to provide a system which overcomes the above-cited problems, meanwhile being simple in design and convenient for use.

SUMMARY OF THE INVENTION

In accordance with the invention, effective control for various popular types of commercial, center-powered, agricultural sprinkler, irrigation systems of the type concerned is provided by combining therewith control mechanism comprising means disposed between the pipeline and the mover unit for transmitting rectilinear movement of a rotating member as rectilinear movement of a non-rotating member, a switch assembly mounted on the mover unit in association with and to control operation of the power drive carried by the mover unit, operating means associated with the movement-transmitting means, and a control line mounted on and extending along the pipeline to or near one end thereof for operating the operating means to effect actuation of the switch assembly.

The control line is preferably flexible, such as a cable, and capable of operating the operating means in only one direction. Accordingly, resilient means, such as a spring or springs, is provided for returning the several parts to their original positions.

The means for transmitting rectilinear movement advantageously comprises a non-rotatable element, such as a rectilinear bar, mounted for back and forth movement on the mover unit in association with the power drive, and a rotatable element mounted for back and forth movement on the pipeline adjacent to the power drive for rotation with the pipeline and for transmitting rectilinear movement to the non-rotatable element in one direction when the control line is pulled. The rotatable element is advantageously a flanged sleeve encircling the pipeline and slideable therealong. In order to smoothly transmit the rectilinear movement of the sleeve to the non-rotatable element when the pipeline and sleeve are rotating, antifriction means, such as a roller or a smooth-riding formation at the sleeve-flange-confronting-and-abutting end of the non-rotatable element, is preferably provided.

The power drive normally includes an internal combustion engine, having an ignition system and a self-starter. It also normally includes a power transmission having forward and reverse drives. The non-rotatable element is arranged to sequentially actuate several individual switches of the switch assembly that control, respectively, the ignition, the self-starter, and the direction of operation of the power transmission. In the common case of a hydraulically operated, power transmission arranged to rotate the pipeline and to drive traction wheels of the mover unit, the directional control is a solenoid valve in the hydraulic system which is operated under the control of one of the switches.

The resilient means for returning the parts to their original positions is preferably associated with and active upon the non-rotatable element, so that such element pushes the sleeve backwardly to its original position following any given pull on the control line. Connection between the control line and sleeve is preferably made through a lever arrangement that pushes the sleeve forwardly when the control line is pulled and allows it to be pushed backwardly by the resilient means when the control line is released. To facilitate incremental advance of the switch assembly from one switch to the next, holding means for the control line is preferably provided at the control end of the pipeline and is equipped with individual holding positions arranged sequentially in correspondance with the positions of the individual switches.

THE DRAWINGS

An agricultural sprinkler, irrigating system embodying the best mode presently contemplated of carrying out the invention is illustrated in the accompanying drawings in which:

FIG. 1 represents a perspective view of the assembled system, parts of the pipeline being broken away for convenience of illustration;

FIG. 2, a transverse section taken along the line 2—2 of FIG. 1 extending through the housing of the engine and power transmission assembly on the mover unit, the view being drawn to a considerably larger scale than FIG. 1;

FIG. 3, a fragmentary top plan view of those portions of the mover unit and the pipeline that appear immediately to the right of the switch and engine housings in FIG. 1, such housing having been removed to show the switch assembly and a portion of the power transmission assembly, the view being drawn to a larger scale than that of FIG. 2 and showing the control end portion of the pipeline broken off and displaced to the left of the main part of the pipeline for convenience of illustration;

FIG. 4, a vertical section taken along the line 4—4 of FIG. 3 to show the control mechanism in side elevation;

FIG. 5, is a view corresponding to that of FIG. 4, but illustrating the control mechanism as it appears following incremental pulling of the control line from the neutral starting position of FIGS. 3 and 4 to the final directional travel control position indicated in FIG. 3, intermediate positions of the lever and linkage operating means being indicated by dotted lines;

FIG. 6, a fragmentary top plan view of the switch assembly and of its operating connection with the non-rotatable element, the view corresponding to the upper left-hand portion of FIG. 3 but in position corresponding to the showing of FIG. 5;

FIG. 7, a transverse vertical section taken on the line 7—7 of FIG. 3 and drawn to a somewhat larger scale;

FIG. 8, a similar view taken on the line 8—8 of FIG. 3;

FIG. 9, a view corresponding to a portion of FIG. 6 but showing a modified embodiment that includes an engine-kill switch as a safety measure; and FIG. 10, a wiring diagram showing electrical connections.

DETAILED DESCRIPTION OF THE ILLUSTRATED EMBODIMENT

Figure 6:
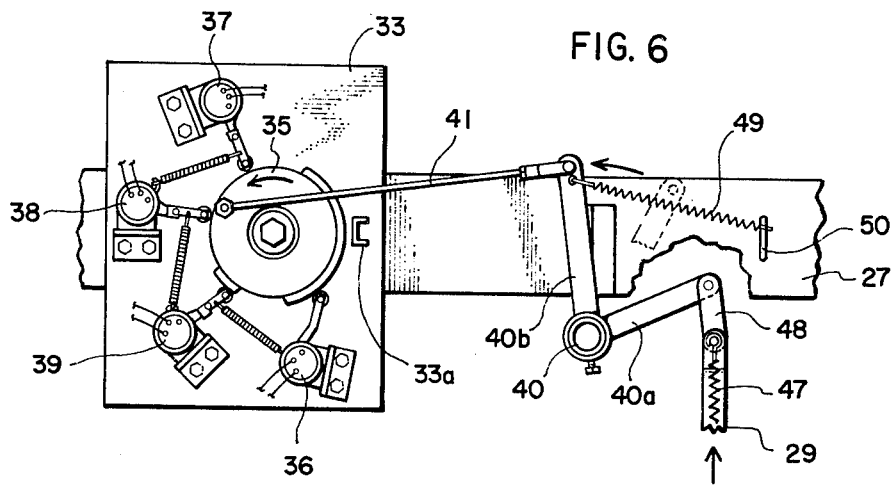
Figure 7:
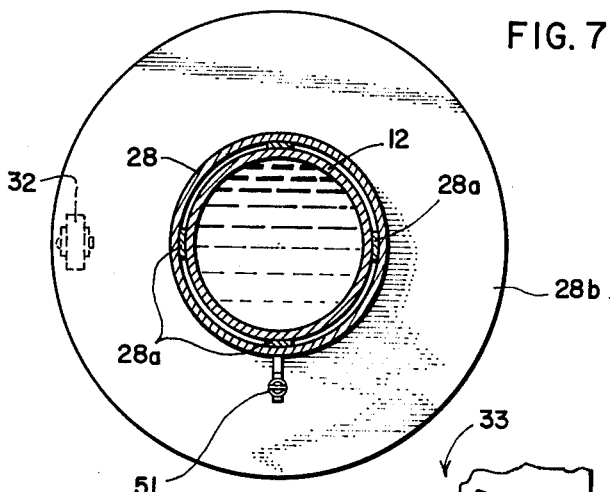
Figure 8:
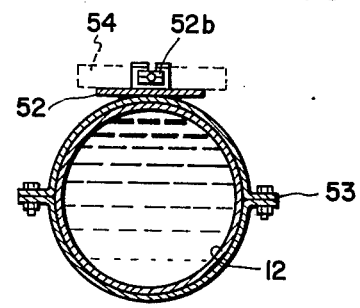

In the form illustrated, sidewise movable pipeline 12, FIG. 1, is made up of pipe sections 12a coupled together end-to-end at 12b, one of the pipe sections extending through a mover unit 13 that is interposed intermediate the length of such pipeline. The pipe sections are provided with wheels 12c, respectively, rigidly attached thereto so the entire pipeline rotates as the mover unit travels from place to place in an area to be irrigated. The pipeline carries sprinkler heads 12d and, as is customary, is adapted to have one of its ends 12e, see also FIG. 3, connected from time to time to a supply line 12f which parallels the path of travel of such pipeline. Outlet connections for the pipeline are provided at intervals along the length of supply line 12f, so that pipeline can be positioned at various irrigating locations from time to time.

Figure 10:
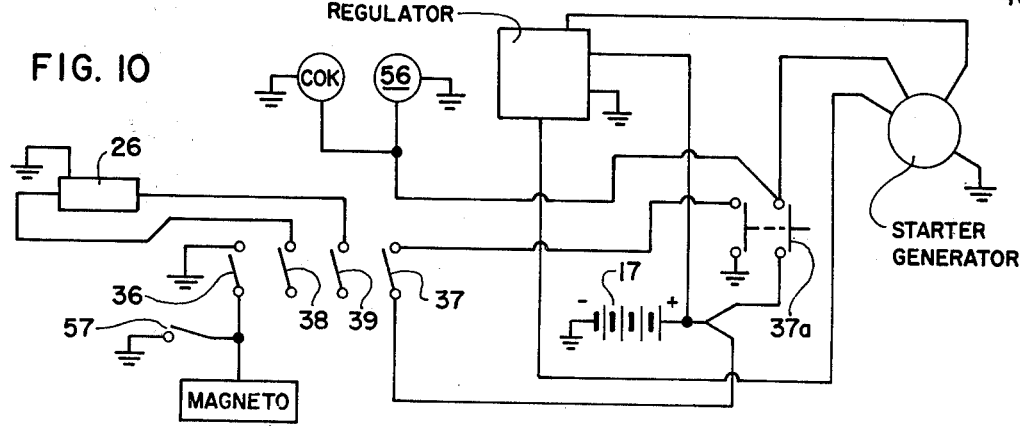

As shown, power drive means 14 is mounted on mover unit 13 within a housing 15 and includes an internal combustion engine 16, FIG. 2, having a conventional magneto ignition system, FIG. 10, and a conventional self-starter serving also as a generator for a storage battery 17 carried by the mover unit. Power drive means 14 also includes a pump 18 in a hydraulic system 19, which powers hydraulic motors 20 equipped with drive sprockets 21, FIG. 3. Such drive sprockets are intermeshed with and serve to rotate a bull gear 22 fixed to pipeline 12. As pipeline 12 rotates, it drive axles 23 (and traction wheels 24 fixed thereto) by means of respective sprocket and chain drives 25. Pump 18 is driven by engine 16 through a drive shaft 16a. A value 26, FIG. 10, in hydraulic system 19 controls the direction of fluid flow in the system and, thus, the direction of travel of mover unit 13 and of pipeline 12. As is conventional, chassis frame 27 of mover unit 13 is hollow and fluid-tight and serves as a reservoir for hydraulic fluid in the hydraulic system.

In accordance with the invention, control of movement of pipeline 12 sidewise across a field to be irrigated is accomplished from end 12e of pipeline 12 by means of control mechanism. Endwise control is highly advantageous, since it is otherwise necessary for the user of the system to walk or run along the pipeline to mover unit 13 each time he must move the system to a new location in the field being irrigated. Moreover, he could be knocked down by the pipeline if he inadvertently moves the valve to the wrong direction of travel. Although the agricultural sprinkler irrigation system described so far is a particular commercial make, the invention may be incorporated in any of the generally similar commercial makes of agricultural sprinkler irrigating systems on the basis of the present disclosure.

In this illustrated embodiment, the means for transmitting rotary rectilinear movement as non-rotary rectilinear movement comprises a rotatable element in the form of a sleeve 28, FIG. 3, encircling pipeline 12 adjacent to mover unit 13 and freely slidable back and forth therealong, and a non-rotatable element in the form of a rectilinear bar 29 mounted on a bracket 30 (secured to mover unit 13) for reciprocable movement in a pair of spaced bearings 31. In this instance, free and easy sliding movement of sleeve 28 is achieved by longitudinal strips 28a of an antifriction plastic applied to the inner surface of the sleeve, which may be made of metal either as a single piece, as shown, or, alternatively, in two longitudinal sections for clamping about the pipeline to facilitate installation. The entire sleeve could, of course, be made integrally of a suitable plastic material having the structural strength required, whether the sleeve is sectional or otherwise.

An end of bar 29 confronts an end of sleeve 28 in abutting relationship therewith, permitting the sleeve to rotate without correspondingly rotating the bar and thereby enabling the sleeve to effectively transmit its rotary rectilinear movement as solely rectilinear movement. Sleeves 28 is advantageouslywidely flanged at one end, as at 28b, to provide a circular abutment runway, and antifriction means, such as a roller 32, is advantageously carried by the confronting end of bar 29 as a part thereof, so as to smoothly transmit rectilinear motion from the sleeve to the bar despite rotation of the sleeve. Although it is preferred to utilize a roller as such antifriction means, the confrontingend of bar 29 could be made smooth and rounded for direct contact with flange 28b of the sleeve, or some other form of antifriction means could be employed.

Reciprocable bar 29 is adapted to actuate a series of switches for controlling operation of the power drive means. Here, the switches are incorporated in a rotary, electric switch assembly 33, FIG. 3, protected by a removable housing 34, FIGS. 1 and 2. Switch assembly 33 comprises a cam disc 35 operably connected with the end of reciprocable bar 29 that is opposite its sleeve-confronting end. Such switch assembly 33 has several switching stations operated in sequence by cam disc 35 for controlling starting and stopping of engine 16 and for controlling the direction of travel of the pipeline. A station 36, FIG. 10, constitutes an ignition switch and a station 37 constitutes a switch for operating the self-starter by means of solenoid switch 37a. Stations 38 and 39 constitute forward and reverse directional switches, respectively, for operating solenoid valve 26 in hydraulic system 19.

In the present instance, bar 29 is operably connected with switch assembly 33 by means of linkage members comprising a bellcrank 40, FIG. 3, and a rod 41. Bar 29 is pivotally connected to one arm of the bellcrank and rod 41 to the other arm and to the rim of cam disc 35. Movement of cam disc 35 is incremental based on incremental movement of bar 29. A stop member 33a establishes neutral or "off" position for rod 41.

A short cam 35a and a relatively long cam 35b, disposed in spaced relationship around the periphery of cam disc 35, determine the time and duration of switch actuation. Thus, upon rotation of cam disc 35 from the neutral or "off" position of FIG. 3, long cam 35b opens normally closed ignition switch 36 (to disconnect the magneto from ground, see FIG. 10) prior to short cam 35a closing normally open starter switch 37, and maintains it open until cam disc 35 is returned to the "off" position. The extent of rotation determines which of normally-open, directional switches 38 and 39 is closed.

Although the switch assembly is here shown as rotary, it may be otherwise. For example, the several switches could be arranged rectilinearly for direct actuation by back and forth movement of rectilinear bar 29, without the connecting linkage described.

For operating the switch assembly by means of the movement-transmitting means, here sleeve 28 and bar 29, a control line 42 extends along the length of pipeline 12 to the control end 12e thereof from linkage 43, which constitutes part of operating means for the movement-transmitting means and is located adjacent to and connected with sleeve 28. Such control line is preferably flexible, being usually a cable, and passes through the spokes of wheels 12c and through supporting eyelets 44, as shown in FIG. 1.

Linkage 43 comprises a bifurcated lever 43a straddling pipeline 12 and pivotally attached intermediate its length and at opposite sides thereof to such pipeline as by means of a clamp-on collar 45. Linkage 43 also comprises links 43b pivotally secured, respectively, at one set of ends to one set of arms of lever 43a, and pivotally attached, respectively, at the other set of ends of opposite sides of sleeve 28. Control line 42 is attached in common, at 46, to the other set of arms of lever 43a, which converge to an apex for the purpose.

Thus, pulling control line 42 at the control end of pipeline 12 will push sleeve 28 along pipeline 12 toward bar 29, and such bar will, in turn, be pushed and will closely follow this forward travel of sleeve 28. Forward travel of bar 29 will effect rotation of cam disc 35 through linkage members 40 and 41.

It should be noted here that the antifriction end 32 of bar 29 constantly abuts against the confronting surface of sleeve flange 28b, and that backward, i.e., return, movement of both bar and sleeve, in instances wherein the control line is flexible, is effected by means for operating the aforementioned sleeve-operating means in the reverse direction.

Such reverse operating means constitutes part of the overall operating means for the movement-transmitting means, and in the present instance is resilient, being made up of several springs which serve to return cam disc 35, member 41 and 40, bar 29, sleeve 28, links 43b, lever 43a, and control line 42 to their original neutral, i.e., "off," positions following release of control line 42 subsequent to any pulling thereof to a control position. As shown in FIGS. 4 and 5, each of a pair of coil springs 47 has an end attached to an arm 40a, of FIG. 3, of bellcrank 40 by means of a link 48, and the other end anchored to bracket 30 by means of bracket arm extensions 31a of the remote one of the bearings 31. Aiding such springs 47 is another coil spring 49 connected between a hasp anchor 50 and the other arm 40b of bellcrank 40, and still another coil spring 51 anchored at one end to sleeve flange 28b and at the other end to a tab 45a of clamp-on collar 45.

Although several return springs are employed in this illustrated embodiment, it is conceivable that a single return spring of sufficient strength could be used at a suitable strategic location. This is particularly true if bar 29 is arranged to directly operate a rectilinear array of control switches.

Since control is exercised at the control end 12e of pipeline 12 by incremental pulling of control line 42, means are preferably provided at such control end of the pipeline for holding the corresponding end of control line 42 at the termination of any control increment of pull. Thus, as illustrated in FIG. 3, an elongate holding device 52 is attached to pipeline 12, as by means of a collar clamp 53, and provides a series of holding stations 52a, 52b, and 52c, respectively, along its length spaced in correspondance with the spacing of the several switch stations of switch assembly 33. For convenience of operation, control line 42 is provided with a transversely extending handle 54, and, for control purposes, such control line is provided with a latching tab 55 forwardly of the handle for selective engagement with any one of the holding stations of holding device 52. When control line 42 is released from the holding device, it assumes the neutral or "off" position shown in full lines in FIG. 3.

It will be seen that the system disclosed herein is highly effective in operation, allowing movement of the irrigation line by a user from the end of such irrigation line. It will also be seen that while being highly efficient in use, the control system is simple in design and manufacture.

It is convenient for the user to be able to tell visually that the starter is operating when the control line is pulled to the engine-starting station. Accordingly, it is advantageous to provide an electric light 56, FIG. 10, usually red, in the electrical control circuit and at a location on mover unit 13 easily seen from the control end of the pipeline.

Figure 9:
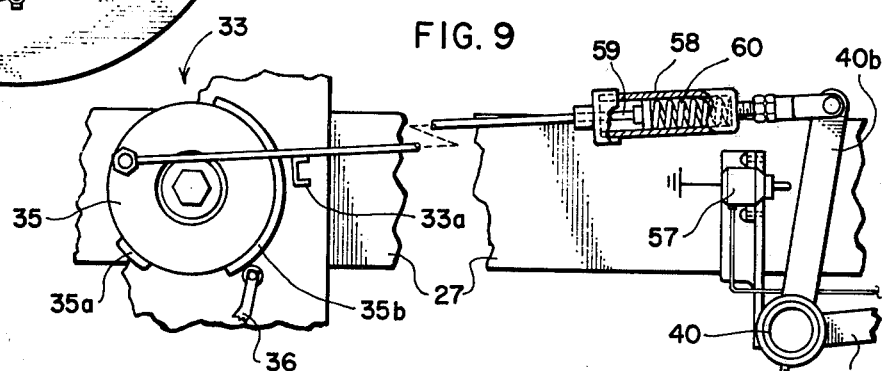

As a safety measure, it is desirable to provide means, such as a "kill switch" in the electrical control circuit, whereby the operator can positively "kill" the engine at any time. For this purpose in the present embodiment, there is provided a normally open, magneto-grounding switch 57, FIGS. 9 and 10, adjacent to arm 40a of bellcrank linkage member 40. The normal linkage rod member 41 is made in two separate parts that are resiliently joined together by a cylinder member 58, secured to one part, and a piston member 59, secured to the other part, with a compression spring 60 positioned therebetween within the cylinder member. Switch 57 is thrown to closed positioned to ground the magneto and thereby "kill" the engine only when an excessively strong pull is exerted on control line 42.

Other arrangements for a "kill switch" can, of course, be resorted to depending upon alternative structural forms that may be adopted for the end control system of the invention.

Whereas this invention is here specifically illustrated and described with reference to an embodiment thereof presently contemplated as the best mode of carrying out the invention, it should be understood that various changes may be made without departing from the inventive concepts described herein and particularly set forth in the following claims.

What is claimed is:

1. Control mechanism for use with an agricultural sprinkler, irrigation system, said system having wheel-mounted pipe sections and a mover unit coupled together end-to-end to form a sidewise movable pipeline having the mover unit interposed intermediate its length and including power drive means for rotating the pipeline about its longitudinal axis, said control mechanism being adapted to control the power drive means from an end of the pipeline and comprising movement-transmitting means adapted to be disposed between the pipeline and the mover unit and including a rotatable element adapted for mounting on the pipeline so it can be reciprocated back and forth therealong while rotating therewith, and a non-rotatable element adapted to be mounted on said mover unit so as to be moved rectilinearly by said rotatable element; a switch assembly mounted on the mover unit in association with and to control operation of said drive means; operating means associated with the movement-transmitting means; and a control line mounted on and extending along the pipeline substantially to one end thereof for operating said operating means to effect actuation of said switch assembly.

2. A system in accordance with claim 1, wherein the control line is adapted to operate the operating means in one direction to effect actuation of the switch assembly; and wherein means are provided for operating said operating means in the return direction.

3. A system in accordance with claim 2, wherein the non-rotatable element is adapted to be mounted on the mover unit in association with the power drive means and the rotatable element is adapted to be mounted on the pipeline adjacent to the drive means for rotation with said pipeline and for transmitting only rectilinear movement to said nonrotatable element in the one direction when the control line is pulled.

4. A system in accordance with claim 3, wherein the rotatable element is a sleeve adapted to encircle the pipe section on which it is to be mounted and to move therealong; and wherein the non-rotatable element confronts an end of the sleeve in abutting relationship therewith.

5. A system in accordance with claim 4, wherein the sleeve is flanged to provide a circular abutment runway for the non-rotatable element.

6. A system in accordance with claim 5, wherein antifriction confronting and abutting means is provided on the non-rotatable element for running against the circular abutment runway of the flange of the sleeve.

7. A system in accordance with claim 6, wherein the antifriction confronting and abutting means comprises a roller.

8. A system in accordance with claim 5, wherein the non-rotatable element is a rectilinear bar adapted for mounting on the mover unit in association with the drive means to slide back and forth in rectilinear reciprocating movement and to follow rectilinear movement of the sleeve in the one direction.

9. A system in accordance with claim 5, wherein the switch assembly is operably associated with the end of the bar that is remote from the sleeve.

10. A system in accordance with claim 3, wherein the means for operating the operating means in the return direction comprises resilient means.

11. A system in accordance with claim 10, wherein holding means is provided at the one end of the pipeline from which control is exercised, said holding means being adapted to hold the control line in positions corresponding to respective increments of pull thereon required for sequential operation of the switch assembly.

12. A system in accordance with claim 3, wherein the means for operating the operating means in the return direction comprises one or more springs associated with and active upon the non-rotatable element.

13. A system in accordance with claim 9, wherein the means for operating the operating means in the return direction comprises one or more springs associated with and active upon the bar.

14. A system in accordance with claim 13, wherein the operating means includes a lever and linkage connecting the control line with the sleeve; and wherein a series of control-line-holding means is provided at intervals along the one end of the pipeline from which control is exercised, the several holding means of said series corresponding to respective increments of pull on said control line required for sequential operation of the switch assembly.

15. A system in accordance with claim 1, wherein the power drive means includes an internal combustion engine equipped with an ignition system and a self-starter, and further includes a power transmission equipped with forward and reverse drives; and wherein the switch assembly comprises a series of individual switches arranged for operation in sequence to controlignition, engine starting, and direction of drive, respectively.

16. A system in accordance with claim 15, wherein there is also provided an engine-kill switch in the engine ignition system as a safety measure, and switch being arranged for actuation by exerting pull on the control line additional to that required to operate the switch assembly.

17. A system in accordance with claim 15, wherein the switch assembly is rotary; and wherein operable association between the switch assembly and the movement-transmitting means is established by the provision of linkage for rotating the switch assembly.

18. A system in accordance with claim 17, wherein there is also provided an engine-kill switch in the engine ignition system as a safety measure, said switch being associated with the linkage for actuation thereby on override of said linkage beyond normal operating position, said linkage having a resilient portion permitting override upon excessive pull exerted on the control line.

19. An end-control, agricultural sprinkler, irrigation system, comprising wheel-mounted pipe sections; a mover unit; means coupling said pipe sections and said mover unit together end-to-end as a rotatable, sidewise movable pipeline having the mover unit interposed intermediate its length; power drive means mounted on and movable with said mover unit for rotating the pipeline about its longitudinal axis; and control mechanism for controlling the power drive means from an end of the pipeline; said control mechanism including movement-transmitting means disposed between said pipeline and said mover unit and comprising a rotatable element mounted on the pipeline so it can be reciprocated back and forth therealong while rotating therewith, and a non-rotatable element mounted on said mover unit so as to be moved rectilinearly by said rotatable element; a switch assembly mounted on the mover unit in association with and to control operation of said drive means; operating means associated with the movement-transmitting means; and a control line mounted on and extending along the pipeline substantially to one end thereof for operating said operating means to effect actuation of said switch assembly.

20. A system in accordance with claim 19, wherein the control line is adapted to operate the operating means in one direction to effect actuation of the switch assembly; and wherein means are provided for operating said operating means in the return direction.

* * * * *